L. Z. MORSE.
ELECTRIC BICYCLE LAMP.
APPLICATION FILED OCT. 2, 1915.
1,220,359.
Patented Mar. 27, 1917.
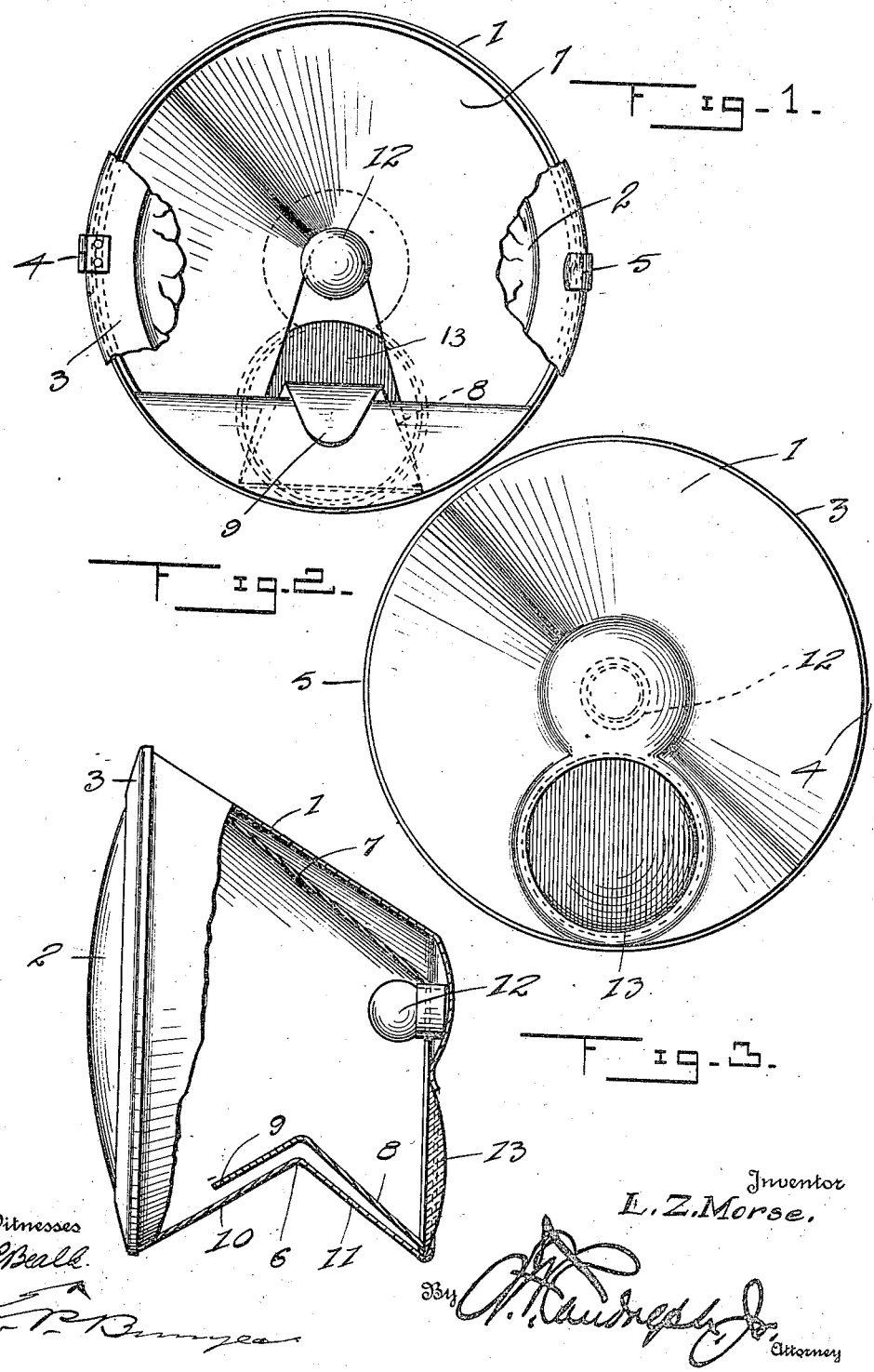

UNITED STATES PATENT OFFICE.

LAURENCE Z. MORSE, OF SHELTON, CONNECTICUT.

ELECTRIC BICYCLE-LAMP.

1,220,359.  Specification of Letters Patent.  Patented Mar. 27, 1917.

Application filed October 2, 1915. Serial No. 53,817.

*To all whom it may concern:*

Be it known that I, LAURENCE Z. MORSE, a citizen of the United States, residing at Shelton, in the county of Fairfield and State of Connecticut, have invented certain new and useful Improvements in Electric Bicycle-Lamps; and I do hereby declare the following to be a full, clear, and exact description of the invention, such as will enable others skilled in the art to which it appertains to make and use the same.

This invention relates to an electric bicycle lamp, and one of the principal objects of the invention is to provide an electric lamp having at the front a lens, and at the back a red bull's eye, and a reflector which will reflect the light through the front lens, and through the bull's eye at the back.

Another object of the invention is to provide an electric lamp for use on bicycles which will serve the purpose both as a front and rear light, to thus comply with laws which have been passed in certain States requiring a light at both the front and back of a bicycle.

The foregoing and other objects may be attained by means of the construction illustrated in the accompanying drawings, in which—

Figure 1 is a front elevation of an electric light made in accordance with this invention, and showing the front door broken away, Fig. 2 is a rear elevation of the lamp, and Fig. 3 is side elevation shown partly in section of the same.

Referring to the drawing, the numeral 1 designates a lamp casing having a lens 2 fitted in the front end thereof, said lens being fitted in a door 3 provided with a hinge 4 and a latch 5. The under side of the casing 1 is bent upward through the center as shown at 6. A reflector 7 which extends within the casing 1 has a tongue portion 8 cut from the body of the reflector and bent down over the bottom of the casing, the end 9 of said tongue being disposed above the inclined portion 10 of the casing. The tongue 8 is disposed above the oppositely inclined portion 11 of the casing.

An electric bulb 12 is secured at the back of the casing and a battery and connections are carried by the bicycle or machine.

A red bull's eye 13 is connected to the lamp in the rear, and the light bulb 12 projects its rays through the lens 2, and by reflection from the surface 8 of the reflector back through the red light bull's eye 13.

From the foregoing, it will be obvious that an electric lamp made in accordance with this invention will serve both as a head and tail light for a bicycle, thus obviating the necessity for two lamps.

Various changes may be made in the details of construction without departing from the spirit and scope of the invention as defined in the claims.

What is claimed is:—

1. An electric light for an electric lamp for a bicycle comprising a casing, a lens in the front of the casing, and an electric light in the back of the casing, a red bull's eye in the back of the casing, and a reflector having an angular cutout portion bent inwardly and downwardly to conform to the shape of the bottom of the casing to reflect the rays of light through the lens and through the bull's eye.

2. An electric lamp comprising a casing having an inwardly bent lower side, a lens in the front of the casing, an electric light bulb connected near the top at the back of the casing, a bull's eye connected to the casing at the back near the bottom thereof, and a reflector provided with a cut-out tongue bent down to conform to the shape of the bottom of the casing to reflect the rays of light backward through the bull's eye.

3. An electric lamp for bicycles comprising a casing having an inwardly bent lower side, a lens in the front of the casing, an electric light at the back of the casing, a colored bull's eye near the bottom at the back of the casing, and an angular reflector for reflecting the rays of light from the bulb out through the lens in the front, and back through the colored bull's eye in the rear.

In testimony whereof I affix my signature in presence of two witnesses.

LAURENCE Z. MORSE.

Witnesses:
 S. T. PALMER,
 C. Z. MORSE.